G. H. GIBBS.

Piston-Valves.

No. 5,984. Reissued July 28, 1874.

Witnesses

Ad. Kidgwick

Alex F. Roberts

Inventor:

Geo. H. Gibbs

THE GRAPHIC CO. PHOTO-LITH. 39 & 41 PARK PLACE, N.Y.

UNITED STATES PATENT OFFICE.

GEORGE H. GIBBS, OF CORRY, PENNSYLVANIA.

IMPROVEMENT IN PISTON-VALVES.

Specification forming part of Letters Patent No. 139,463, dated June 3, 1873; reissue No. 5,984, dated July 28, 1874; application filed May 9, 1874.

*To all whom it may concern:*

Be it known that I, GEORGE H. GIBBS, of Corry, in the county of Erie and State of Pennsylvania, have invented a new and useful Improvement in Steam-Chest and Balance Slide-Valve, of which the following is a specification:

The nature of my invention consists in the construction and arrangement of a piston-valve to be used with steam, compressed air, or vapor, as will be hereinafter more fully set forth.

In order to enable others skilled in the art to which my invention appertains to make and use the same, I will now proceed to describe its construction and operation, referring to the annexed drawings, in which—

Figure 1:
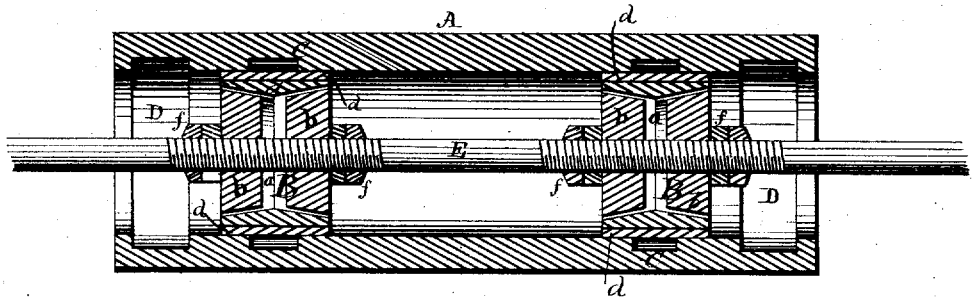
Figure 2:
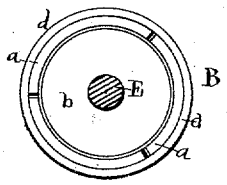
Figure 3:
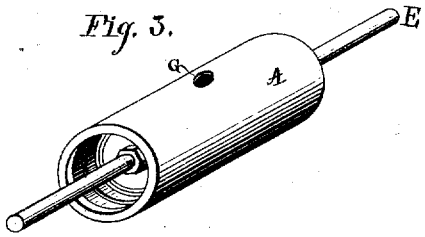

Figure 1 is a longitudinal section of the chest and valve. Fig. 2 is an end view of the valve, and Fig. 3 is a perspective view of the steam-chest in reduced dimensions.

Similar letters of reference indicate corresponding parts.

A represents the steam-chest, which is of cylindrical form, and may be cast separately or in the same piece with the cylinder, the bore of said chest being parallel with the bore of the cylinder, and the chest located either above or below, or on either side of the cylinder, as required.

In the drawing, I have represented the steam-chest without heads, which are not required when the chest is used with an engine worked with compressed air; but when steam is to be used heads must be inserted with suitable stuffing-boxes for the valve-stem to pass through.

B B represent the valves on the valve-stem E. C C are the steam-ports, and D D the exhaust-ports, all of which ports extend or are chambered out clear around the bore of the steam-chest, and from these chambers are extended into and out of the cylinder in suitable side pipes cored out in the casting.

The steam is admitted into the steam-chest at G, into the cylinder at C C, and out of the steam-chest at D D. The valves B B being annular and fitting the steam-chest perfectly, the pressure is alike on each, and as soon as the valves are moved to admit the steam at either port C the steam will, at that time, entirely surround the valve, and the pressure is alike on all sides.

In this arrangement it is only necessary to pack against exhaust steam at the front head, as the rod runs through it only, and the back head will be closed.

In the drawing, I have shown them constructed in the following manner: *a* is a metal ring, made tapering at both ends, and after it is turned out the washers *b b* are turned to fit, as shown. The ring *a* is then cut into sections, as represented in Fig. 2, and then fastened together, and a ring, *d*, fitted around them. By screwing up the nuts *f f* the washers J J are brought together, which forces the sections of the ring *a* outwardly, and expands the ring *d*. The nuts *f f*, besides expanding the valves, are used to adjust the valves on the valve-stem E.

When used for compressed air no heads are required, and no exhaust side pipes or ports.

It will readily be seen that by this arrangement of parts the valves, whether solid or otherwise, are perfectly and accurately balanced.

The steam-ports C C being located on the inside of the exhaust-ports D D, I am enabled to very materially shorten the valve, reduce the friction, and gain a much more free exhaust than can be obtained in the old manner; also, the ports extending entirely around the steam-chest, thereby gaining a great length of port in a convenient and very desirable manner.

With this style of valve and steam-chest the parts are less liable to wear by use, as there is no pressure, and but little bearing-surface presented, and that is the face of the ring *d*, which, when worn, may be easily replaced, and does not require turning.

The valve has a very short travel when compared with valves now in use.

In a steam-chest with as much length of port as is commonly used on a twelve-inch cylinder engine my valve has only two and three-quarter inches travel.

The arrangement allows of reversing the steam and exhaust ports for admitting the steam at each end of the chest or outside of the steam-ports, which, in this arrangement, would take the place of the exhaust-ports D, and for the exhaust the steam would escape into the space between the valves, from which space it would escape by any suitable passage. I consider both of these arrangements equivalent to each other.

Having thus described my invention, I claim as new and desire to secure by Letters Patent—

A balance-valve consisting of two cylindrical pistons, B, attached to a valve-rod, E, in combination with a hollow cylinder, A, having ports C D, the arrangement being such that the live and exhaust steam balance on the two pistons, substantially as specified.

GEO. H. GIBBS.

Witnesses:

C. SEDGWICK,

ALEX. F. ROBERTS.